US006088438A

United States Patent [19]
Yoo

[11] Patent Number: 6,088,438
[45] Date of Patent: Jul. 11, 2000

[54] METHOD OF AND APPARATUS FOR NETWORKING A PLURALITY OF PRIVATE BRANCH EXCHANGE SYSTEMS USING ISDN LINES

[75] Inventor: Choon-Ho Yoo, Seoul, Rep. of Korea

[73] Assignee: SamSung Electronics Co., Ltd., Suwon, Rep. of Korea

[21] Appl. No.: 08/903,833

[22] Filed: Jul. 31, 1997

[30] Foreign Application Priority Data

Jul. 31, 1996 [KR] Rep. of Korea ................. 96-32018

[51] Int. Cl.[7] .................. H04M 3/42; H04M 7/00
[52] U.S. Cl. .................. 379/225; 379/209; 379/219; 379/229; 379/211
[58] Field of Search .................. 379/209, 219, 379/220, 221, 229, 211, 242, 243, 225, 232, 230, 233, 234

[56] References Cited

U.S. PATENT DOCUMENTS

| | | | |
|---|---|---|---|
| 4,953,195 | 8/1990 | Ikemori | 379/33 |
| 5,305,312 | 4/1994 | Fonek et al. | 370/264 |
| 5,305,313 | 4/1994 | Katoh | 370/264 |
| 5,319,640 | 6/1994 | Yamasaki et al. | 370/362 |
| 5,422,943 | 6/1995 | Cooney et al. | 379/225 |
| 5,450,396 | 9/1995 | Havermans | 370/385 |
| 5,450,486 | 9/1995 | Maas et al. | 379/399 |
| 5,455,855 | 10/1995 | Hokari | 379/229 |
| 5,481,605 | 1/1996 | Sakurai et al. | 379/243 |
| 5,550,822 | 8/1996 | Ikeda | 370/426 |
| 5,550,906 | 8/1996 | Chau et al. | 379/207 |
| 5,621,731 | 4/1997 | Dale et al. | 370/257 |

*Primary Examiner*—Scott Wolinsky
*Assistant Examiner*—David Huynh
*Attorney, Agent, or Firm*—Robert E. Bushnell, Esq.

[57] ABSTRACT

A method for networking a plurality of the private branch exchange systems is disclosed in which it is possible to both basically exchange information for the networking by using an ISDN line as a private wire in order to connect mutually a plurality of the private branch exchange systems and transmit/receive necessary information between systems by employing D channel with a line signal and an ISDN protocol and designating the specific channel of B channel to a networking private channel for the networking operation. In addition, one or two channels of several channels between a plurality of the private branch exchange systems can be used for exchanging information, so that the exchange of data between systems operating on a network enables expansion of a system and share of common resources, thereby to improve the efficiency of a system.

26 Claims, 3 Drawing Sheets

CALL INCOMING TABLE OF B-CHANNEL

| CALLING NUMBER | CALLING NUMBER OF B-CHANNEL | B-CHANNEL NUMBER | B-CHANNEL STATUS | NODE NUMBER (SYSTEM) |
|---|---|---|---|---|
| 401-499 | 400 | 30th | A/I | B |
| 501-599 | 500 | 2th | A/I | C |
| ⋮ | ⋮ | ⋮ | ⋮ | ⋮ |

\* A/I = Active/Idle

Fig. 3A

| CALLED NUMBER | B-CHANNEL NUMBER | B-CHANNEL STATUS | NODE NUMBER (SYSTEM) |
|---|---|---|---|
| 400 | 30th | A/I | B |
| 500 | 2th | A/I | C |
| ⋮ | ⋮ | ⋮ | ⋮ |

Fig. 3B

METHOD OF AND APPARATUS FOR NETWORKING A PLURALITY OF PRIVATE BRANCH EXCHANGE SYSTEMS USING ISDN LINES

CLAIM FOR PRIORITY

This application makes reference to, incorporates the same herein, and claims all benefits accruing under 35 U.S.C. §119 from an application for METHOD FOR NETWORKING A PLURALITY OF PRIVATE BRANCH EXCHANGE SYSTEMS earlier filed in the Korean Industrial Property Office on Jul. 31, 1996, and there duly assigned Serial No. 32018/1996, a copy of which application is annexed hereto.

BACKGROUND OF THE INVENTION

1. Technical Field

The present invention relates to a network of private branch exchange systems using ISDN lines, and more particularly, relates to a method for networking a plurality of the private branch exchange systems for sharing common resources by connecting mutually the private branch exchange systems using ISDN lines.

2. Related Art

Generally, a conventional telephone network is a dedicated service network intended to provide only specific communication service to terminal subscribers. Typically, private branch exchange systems are connected to a public switched telephone network (PSTN) via private wires to provide voice communication services. In contrast to a conventional telephone network, integrated services digital network (ISDN) offers a variety of new features including multimedia communication service such as voice, high speed data and image communication services and other additional non-voice communication services via network interfaces on the basis of digitization of the telephone network. These new features have attracted contemporary private branch exchange systems for integration to benefit from ISDN services such as disclosed, for example, in U.S. Pat. No. 5,305,313 for Electronic Switching System For Use In Connection To An ISDN And Method Of Setting Communication Disconnection Reasons issued to Katoh, U.S. Pat. No. 5,450,396 for Communication System And A Private Branch Exchange To Be Used In Such A Communication System issued to Havermsan, U.S. Pat. No. 5,481,605 for Private Branch Exchange Capable Of Analyzing Information Received From ISDN issued to Sakurai et al., and U.S. Pat. No. 5,621,731 for Private Exchange For ISDN issued to Dale et al.

As the ISDN services become widely in use, the private exchange and its terminal stations connected to the ISDN must effectively accommodate multimedia communication services and a variety of other additional services through the ISDN. ISDN interfaces must be provided in the private branch exchange system on the basis of network interface standards. Exemplary ISDN interfaces for private branch exchange system are disclosed in U.S. Pat. No. 5,305,312 for Apparatus For Interfacing Analog Telephones And Digital Data Terminals To An ISDN Line issued to Fornek et al., U.S. Pat. No. 5,450,486 for Telecommunication System And A Linecard issued to Maas et al., U.S. Pat. No. 5,319,640 for Transmitting/Receiving System Having Digital Switching Network issued to Yamasaki et al., and U.S. Pat. No. 5,550,822 for Private Branch Exchange issued to Ikeda. ISDN interface facilities may be used to facilitate communications and signaling between a plurality of private branch exchange systems in a network as disclosed, for example, in U.S. Pat. No. 5,422,943 for Private Branch Exchange Networks issued to Cooney et al., and U.S. Pat. No. 5,455,855 for System For Connecting Public Network Subscriber And Private Network Subscriber issued to Hokari. While these ISDN interfaces are implemented in accordance with network interface standards and networking between private branch exchange systems are possible, I have noted that further improvement in a method for enabling networking between a plurality of private branch exchange systems each using an ISDN line as a private wire can still be contemplated.

SUMMARY OF THE INVENTION

Accordingly, it is therefore an object of the present invention to provide a network of private branch exchange systems mutually connected together using ISDN Primary Rate Interface (PRI) as a private line for enabling the basic exchange of information and sharing common resources.

It is also an object of the present invention to provide a method for enabling the basic exchange of information for the networking of private branch exchange systems using an ISDN Primary Rate Interface as a private wire for mutual connection.

It is another object of the present invention to provide a method for enabling the transmission/reception of necessary information between private branch exchange systems by employing D channel with a line signal and ISDN protocol and designating the specific channel of B channel as a networking private channel for the networking operation.

These and other objects of the present invention can be achieved by a method for connecting mutually a first PBX system A and a second PBX system B, comprising the steps of: (a) analyzing the called telephone number through the first PBX system A to determine in which system the number exists and determining whether or not said call is a networking call when dialing at a telephone A of the first PBX system A in the case of telephoning over the telephone in the system A connected to the system B; (b) connecting a call if X channel is active after determining whether X channel is in an active state and sending a call to the system B by calling said X channel and the call simultaneously and if not, prior to the formation of a call using a PRI line; and (c) sending and receiving information between two systems A and B through the X channel, which is generated while trying to make a telephone call, the line being busy or a telephone call being over and maintaining the information during a regular time although there is no related call for the X channel as required.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 3A and 3B represent a call incoming table of B channel and a call outgoing table of B channel according to an embodiment of the present invention.

DETAILED DESCRIPTION OF THE PREFERRED EMBODIMENT

Figure 1:
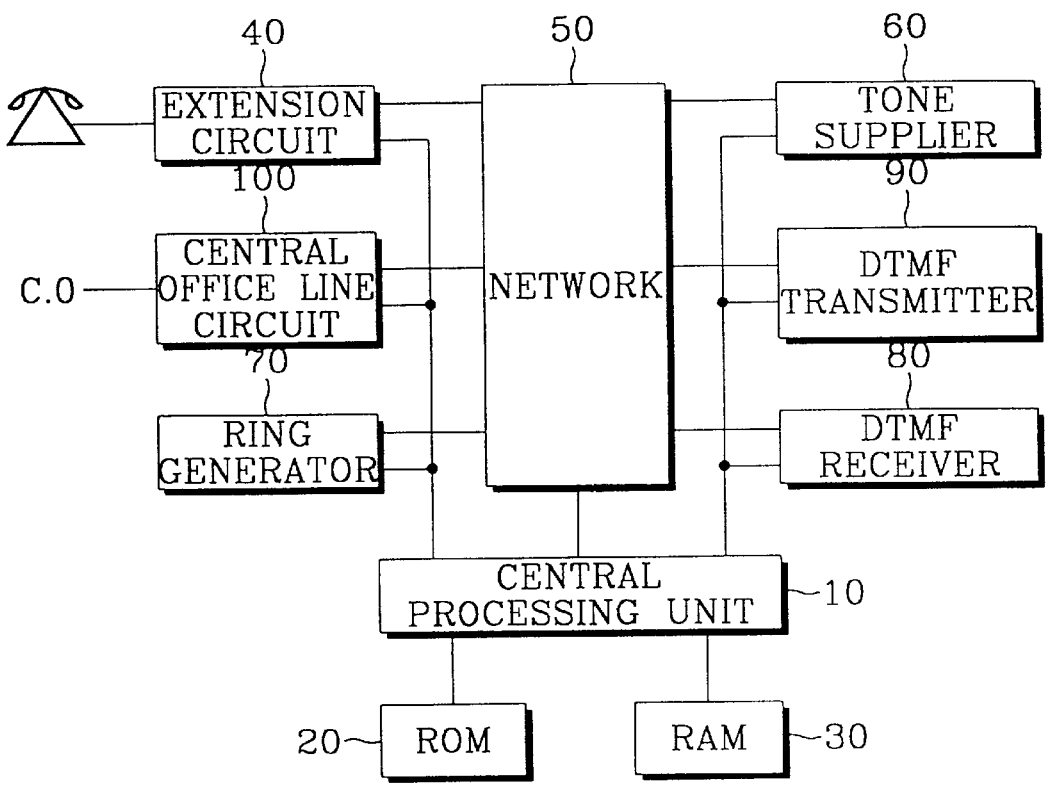
FIG. 1 illustrates a typical private branch exchange system.

Referring now to the drawings and particularly to FIG. 1, which illustrates a contemporary private branch exchange (PBX) system. Generally, the private branch exchange (PBX) system is connected using mainly a private wire which is regarded as a private central office. For purposes of networking, at least two private branch exchange (PBX) systems are mutually connected via private wires. However, there is no special method for networking a plurality of the private branch exchange systems.

As shown in FIG. 1, the typical private branch exchange (PBX) system includes a central processing unit (CPU) 10 for controlling not only a telephone call switching by accessing a predetermined program but also all kinds of services and functions according to the present invention. A read-only-memory (ROM) 20 stores an application program for performing a call and a variety of functions including initial service data. A random-access-memory (RAM) 30 is used as a working memory of the CPU 10 having a program and data processing area. An extension circuit 40 provides an extension telephone of a extension subscriber with the telephone call current of a voice band and carrying out the interfacing operation between extension devices. A network 50 controls the switching of various tones and voice data under the control of the CPU 10. A tone supplier 60 generates a variety of signals under the control of the CPU 10 and supplies the network 50 with the generated signals. A ring generator 70 supplies the network 50 with a rectangularly shaped ring signal under the control of the CPU 10. A DTMF receiver 80 analyzes a multi-frequency code signal generated from a subscriber of the extension circuit 40 and applies the relevant digital data corresponding to the analysis to the CPU 10. A DTMF transmitter 90 transmits the multi-frequency code signal under the control of the CPU 10, and a central office line circuit 100 for interfacing a signal incoming from a central office line by forming a central office line loop under the control of the CPU 10.

A typical network connection between a plurality of the private branch exchange (PBX) systems is generally made using non-ISDN lines through the central office line circuit 100 for communications services. Non-ISDN lines are, however, incapable of transmitting and receiving networking information between PBX systems. In particular, there is no method which can make use of common resources which often are available for networking. As a result, networking operations are not supported during a basic telephone call. In addition, the connection between a plurality of PBX systems through a private wire imposes a variety of restrictions to the type of communication services available.

Figure 2:
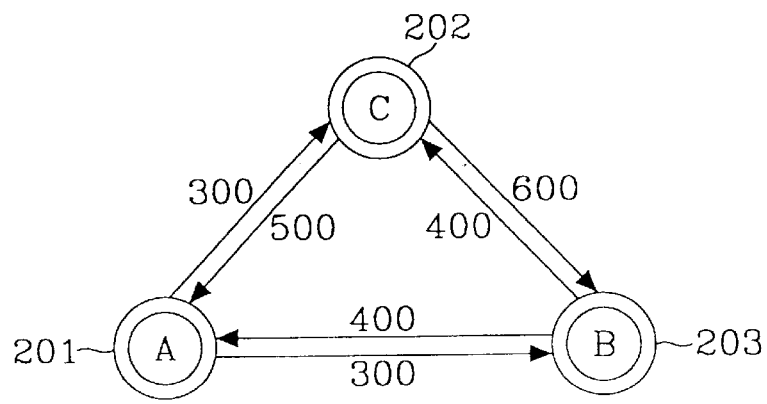
FIG. 2 illustrates a network connection between a plurality of the private branch exchange systems according to an embodiment of the present invention.

Turning now to FIG. 2 which illustrates a network connection between, for example, three private branch exchange (PBX) systems 201–203 and the range of a calling number is 300 units for a first private branch exchange system A 201, the range thereof is 400 units for a second private branch exchange system B 203 and the range thereof is 500 units for a third private branch exchange system C 204. FIG. 3A illustrates a call outgoing table of X channel (i.e. B channel for networking purposes) according to an embodiment of the present invention, and FIG. 3B illustrates a call incoming table of X channel (i.e. B channel for networking purposes) according to an embodiment of the present invention.

Figure 4:
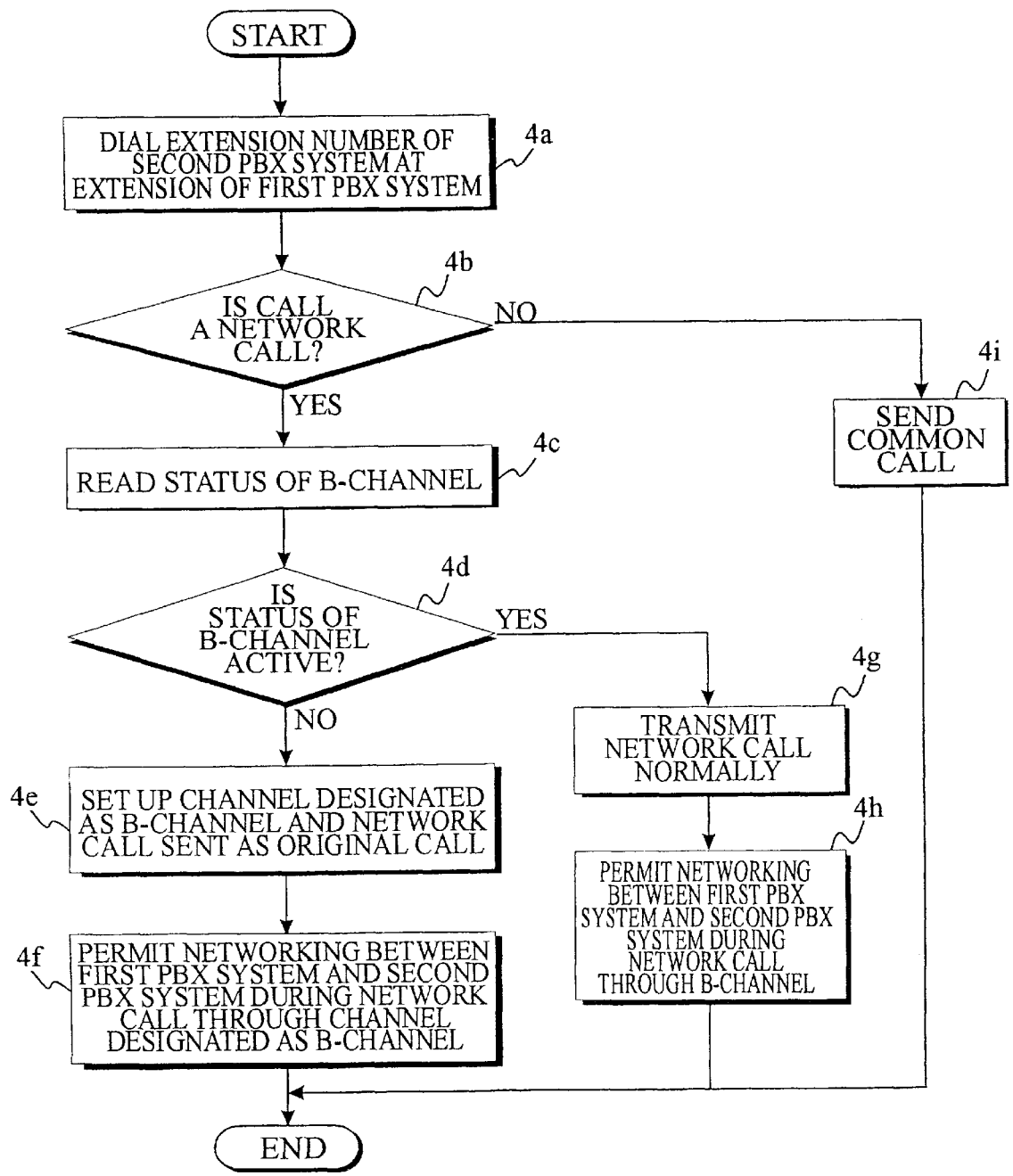
FIG. 4 is a flow chart of a process routine for executing the operation according to an embodiment of the present invention.

Now, an example of the operational process of executing the operation according to an embodiment of the present invention is set forth with reference to FIG. 4.

At step 4a, the dialing operation of an extension number of a second PBX system B at an extension of a first PBX system A is performed. Then, the program proceeds to step 4b at which point it is determined whether or not the call is a networking call within the range of a calling number after analyzing a calling number table. If the call is not a network call within the range of a calling number, a common call is sent at step 4i. If, on the other hand, the call is a network call within the range of a calling number, the program proceeds to step 4c at which point the status of X channel (i.e., B channel for networking purposes) is read after checking that the call is a node of which system by referring to a table of X channel. Then, at subsequent step 4d, it is determined whether or not the status of X channel is active. If YES, i.e. if state of X channel is active, the program proceeds to step 4g at which point the network call is transmitted normally and networking message generated while connecting a call is transmitted and received through X channel at step 4h. That is, program permits networking between the first PBX system A and the second PBX system B during the network call through X channel.

If the status of X channel is not active, however, the program proceeds to step 4e at which point a call is connected so as to set up the channel designated to X channel at the same time, the call is sent as an original call. Then, the message between the two PBX systems are transmitted and received through X channel after comparing a X channel number with a call incoming table of X channel if the X channel number is called and connecting X channel if the call is called in telephone number for X channel at step 4f. That is, the program permits networking between the first PBX system and the second PBX system during the network call through the channel designated as X channel. Then, the program is terminated.

An explanation on the operation according to an embodiment of the present invention will be described in detail with reference to FIGS. 1 to 4 hereinbelow.

As shown in FIG. 1, the ROM 20 or the RAM 30 of each node exchange system stores a call incoming table of X channel and a call outgoing table of X channel. For example, in the case of trying to call an extension number of the second PBX system B 203 at an extension of the first PBX system A 201, since the range of calling number is set to 401–499 for the table of X channel of the second PBX system B 203, the CPU 10 reads the number table as shown in FIG. 3A from the ROM 20 and analyzes the same, and then checks that the call is a network call at step 4b. If the call is not a network call within the range of a calling number, a common call is sent at step 4i. On the other hand, at step 4b, i.e. if the call is a network call within the relevant range of a calling number as shown in FIG. 3A, the program proceeds to step 4c at which point the status of X channel is read after checking that the call is a node of which system by referring to a table of X channel. The X channel is designated to a specific channel in a system and if a call is called, it is confirmed through a calling party number and the calling party sends a call by the telephone number for X channel, i.e. a calling party number.

If it is determined that X channel calling party number within the relevant range of a calling number as described is active at step 4d, the call is transmitted normally at step 4g and networking message generated while connecting a call is transmitted and received through X channel at step 4h. On the other hand, if state of X channel is in an idle state at step 4d, i.e. if it is not active, the program proceeds to step 4e at which a call is connected so as to set up the channel designated to X channel, at the same time, the call is sent as an original call. At next step 4f; if the X channel number is called at the called party, it is connected to the telephone number for the X channel by referring to a call incoming table of X channel as shown in FIG. 3B. At this time, the message between the two PBX systems are transmitted and received through X channel. Then, the program is terminated.

As described above, in the present invention, one or two channels of several channels between a plurality of the private branch exchange PBX systems can be used for exchanging information, so that the exchange of data between PBX systems connected in a network enables expansion of a PBX system and effectively shares common resources, thereby to improve the efficiency of a system. In addition, the present invention advantageously seeks to connect mutually and closely a plurality of PBX systems in such a way that it is now possible to use many PBX systems as if they were one single large communication system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for connecting mutually a first exchange system and a second exchange system, comprising the steps of:

analyzing a called telephone number through the first exchange system to determine in which exchange system said called telephone number exists and determining whether a call corresponding to the called telephone number is a network call when dialing the call at an extension of the first exchange system when the first exchange system is connected to the second exchange system;

if it is determined that the call is a network call, then:
determining if an X channel connected between the first exchange system and the second exchange system is in an active state for the call;
connecting the call if said X channel is in the active state for the call and sending the call to the second exchange system by calling said X channel;
if said X channel is not in the active state for the call, connecting the call so as to set up a channel as said X channel and also sending the call as an original call to the second exchange system; and
sending and receiving information between the first exchange system and the second exchange system through said X channel.

2. The method of claim 1, further comprised of connecting the call so as to set up a channel as said X channel and at the same time also sending the call as an original call, when it is determined said X channel is not in the active state.

3. The method of claim 2, further comprised of the first exchange system and the second exchange system each being a private branch exchange (PBX) system.

4. The method of claim 3, further comprised of connecting the call and sending and receiving information between the first exchange system and the second exchange system using a primary rate interface (PRI) line.

5. The method of claim 4, further comprised of said primary rate interface (PRI) line including an integrated services digital network (ISDN) line having a channel with a line signal and an integrated services digital network (ISDN) protocol and said X channel.

6. The method of claim 1, further comprised of the first exchange system and the second exchange system each being a private branch exchange (PBX) system.

7. The method of claim 6, further comprised of connecting the call and sending and receiving information between the first exchange system and the second exchange system using a primary rate interface (PRI) line.

8. The method of claim 7, further comprised of said primary rate interface (PRI) line including an integrated services digital network (ISDN) line having a channel with a line signal and an integrated services digital network (ISDN) protocol and said X channel.

9. The method of claim 1, further comprised of connecting the call and sending and receiving information between the first exchange system and the second exchange system using a primary rate interface (PRI) line.

10. The method of claim 9, further comprised of said primary rate interface (PRI) line including an integrated services digital network (ISDN) line having a channel with a line signal and an integrated services digital network (ISDN) protocol and said X channel.

11. The method of claim 10, further comprised of said X channel being a B channel and said channel with a line signal being a D channel.

12. The method of claim 1, further comprised of said X channel being a B channel.

13. The method of claim 1, further comprising the steps of:
determining whether the call is a network call within a range of a calling number from a calling number table;
if the call is not a network call within the range of a calling number, sending the call as a s common call; and
if the call is a network call within the range of a calling number, reading the status of said X channel from a calling number table.

14. The method of claim 13, further comprised of connecting the call so as to set up a channel as said X channel and at the same time also sending the call as an original call, when it is determined said X channel is not in the active state.

15. The method of claim 14, further comprised of connecting the call and sending and receiving information between the first exchange system and the second exchange system using a primary rate interface (PRI) line.

16. The method of claim 15, further comprised of the first exchange system and the second exchange system each being a private branch exchange (PBX) system.

17. The method of claim 1, further comprised of sending and receiving information between the first exchange system and the second exchange system through said X channel which is generated while one of trying to make the call, a line for the call being busy and a call being over and maintaining the information even when there is no related call for said X channel.

18. The method of claim 17, further comprised of connecting the call and sending and receiving information between the first exchange system and the second exchange system using a primary rate interface (PRI) line.

19. An apparatus for connecting mutually a first exchange system and a second exchange system, comprising:

means for analyzing a called telephone number through the first exchange system to determine in which exchange system said called telephone number exists and for determining whether a call corresponding to the called telephone number is a network call when dialing the call at an extension of the first exchange system when the first exchange system is connected to the second exchange system;

means for determining if an X channel connected between the first exchange system and the second exchange system is in an active state for the call if it is determined that the call is a network call;

means for connecting the call if said X channel is in the active state and sending the call to the second exchange system by calling said X channel;

means for connecting the call if said X channel is not in the active state so as to set up a channel as said X channel and also sending the call as an original call to the second exchange system; and means for sending and receiving information between the first exchange system and the second exchange system through said X channel.

20. The apparatus of claim 19, further comprised of said means for connecting the call if said X channel is in the active state and said means for connecting the call if said X channel is not in the active state including a primary rate interface (PRI) line.

21. The apparatus of claim 20, further comprised of said means for sending and receiving information between the first exchange system and the second exchange system through said X channel sends and receives information which is generated while one of trying make the call, a line for the call being busy and a call being over and maintains the information even when there is no related call for said X channel.

22. The apparatus of claim 19, further comprised of said means for sending and receiving information between the first exchange system and the second exchange system through said X channel sends and receives information which is generated while one of trying make the call, a line for the call being busy and a call being over and maintains the information even when there is no related call for said X channel.

23. The apparatus of clam 22, further comprised of said X channel being a B channel.

24. The apparatus of claim 19, further comprised of said means for connecting the call if said X channel is in the active state and said means for connecting the call if said X channel is not in the active state including a primary rate interface (PRI) line, said primary rate interface (PRI) line including an integrated services digital network (ISDN) line having a channel with a line signal and an integrated services digital network (ISDN) protocol and said X channel.

25. The apparatus of claim 24, further comprised of said X channel being a B channel.

26. The apparatus of claim 19, further comprised of said X channel being a B channel.

* * * * *